United States Patent
Bennett et al.

[11] Patent Number: 5,899,279
[45] Date of Patent: May 4, 1999

[54] TRACTOR ELECTRONIC LINKAGE CONTROL SYSTEM

[75] Inventors: John Sebastian Bennett; John Penrose Mills, both of Leamington Spa, United Kingdom

[73] Assignee: AGCO Limited, Coventry, United Kingdom

[21] Appl. No.: 09/057,225

[22] Filed: Apr. 8, 1998

[30] Foreign Application Priority Data

Apr. 9, 1997 [GB] United Kingdom ............... 9707201

[51] Int. Cl.$^6$ .............................................. A01B 63/112
[52] U.S. Cl. .................................... 172/7; 701/50
[58] Field of Search ........................... 172/7, 8, 9, 10, 172/2; 701/50

[56] References Cited

U.S. PATENT DOCUMENTS

| | | | |
|---|---|---|---|
| 4,085,806 | 4/1978 | Osujyo et al. | 172/7 X |
| 4,300,638 | 11/1981 | Katayama et al. | 172/7 X |
| 4,495,577 | 1/1985 | Strunk et al. | 172/7 X |
| 4,508,176 | 4/1985 | Wiegardt et al. | 172/7 |
| 4,508,178 | 4/1985 | Cowell et al. | 172/7 X |
| 5,469,921 | 11/1995 | Orbach et al. | 172/4 |
| 5,584,347 | 12/1996 | Bennett | 172/7 |

FOREIGN PATENT DOCUMENTS

| | | |
|---|---|---|
| 102766 | 3/1984 | European Pat. Off. . |
| 212304 | 3/1987 | European Pat. Off. . |
| 543162 | 5/1993 | European Pat. Off. . |
| 572964 | 12/1993 | European Pat. Off. . |
| 694422 | 1/1996 | European Pat. Off. . |
| 2120419 | 11/1983 | United Kingdom . |

Primary Examiner—Christopher J. Novosad
Attorney, Agent, or Firm—MacMillan, Sobanski & Todd, LLC

[57] ABSTRACT

A tractor electronic linkage control system comprises electronic draft force and linkage position sensors (30, 33) and manual draft force and linkage position controls (31, 32). An electronic control unit 17 derives draft and position error signals and continually compares them to determine whether the system is to operate in draft control mode, where the draft error signal governs linkage movement, or position control mode, where the position error signal governs linkage movement.

7 Claims, 2 Drawing Sheets

TRACTOR ELECTRONIC LINKAGE CONTROL SYSTEM

The present invention relates to an electronic system for controlling the height of a tractor three point linkage.

Electronic tractor three point linkage control systems conventionally operate in one of two modes, so called "position control" and "draft control" modes. As is well known, in position control mode the height of the linkage is directly determined by the setting of a first rotary knob or other continuously variable manual control in the tractor cab. This involves a control loop incorporating a sensor to sense the linkage position.

In draft control mode, the height of the linkage is automatically adjusted by the control system so that the force on the linkage equates to a value set on a second rotary knob or similar in the tractor cab. This is achieved by means of a control loop utilising an electronic signal from a force sensor or sensors incorporated in a joint pin or pins in the linkage.

Conventional electronic linkage control systems are equipped with a switch or other similar manual device to control in which of the two modes the system is to operate. Alternatively, a continuously variable "intermix" control is provided together with a single depth/height control. One end of the range of the intermix control equates to draft control and the other to position control. In between these two positions, the control loop error signal is an average of the draft error (representing the difference between the linkage height set by the depth/height control and the actual linkage height) and the position error, weighted in accordance with the position of the intermix control.

An object of the present invention is to provide an electronic linkage control system with more automated and simplified control.

According to the present invention, an electronic linkage control system for a tractor comprises the features set out in claim 1 hereto. Preferable features are set out in the dependent claims.

Further features and advantages of the present invention will be apparent from the following specific description of two embodiments of the invention, made with reference to the following drawings in which:

BRIEF DESCRIPTION OF THE DRAWINGS

In terms of basic components and layout, both embodiments have the same features as follows. Referring to FIG. 1, a three point linkage 1 comprises lower lines 2 and a top link 3, each pivotally mounted on the tractor chassis. The lower links 2 are connected via respective lift rods 4 to a lifting mechanism 5. The lifting mechanism 5 comprises a hydraulic piston/cylinder 6 connected to a connecting rod 7 which is in turn pivotally connected to a rigid structure comprising a central arm 8 extending from the middle of a pivotally mounted shaft 9 at each end of which are projecting arms 10. The lift rods 4 of the three point linkage are pivotally connected to the end of respective projecting arms 10 at a joint 11.

Figure 1:
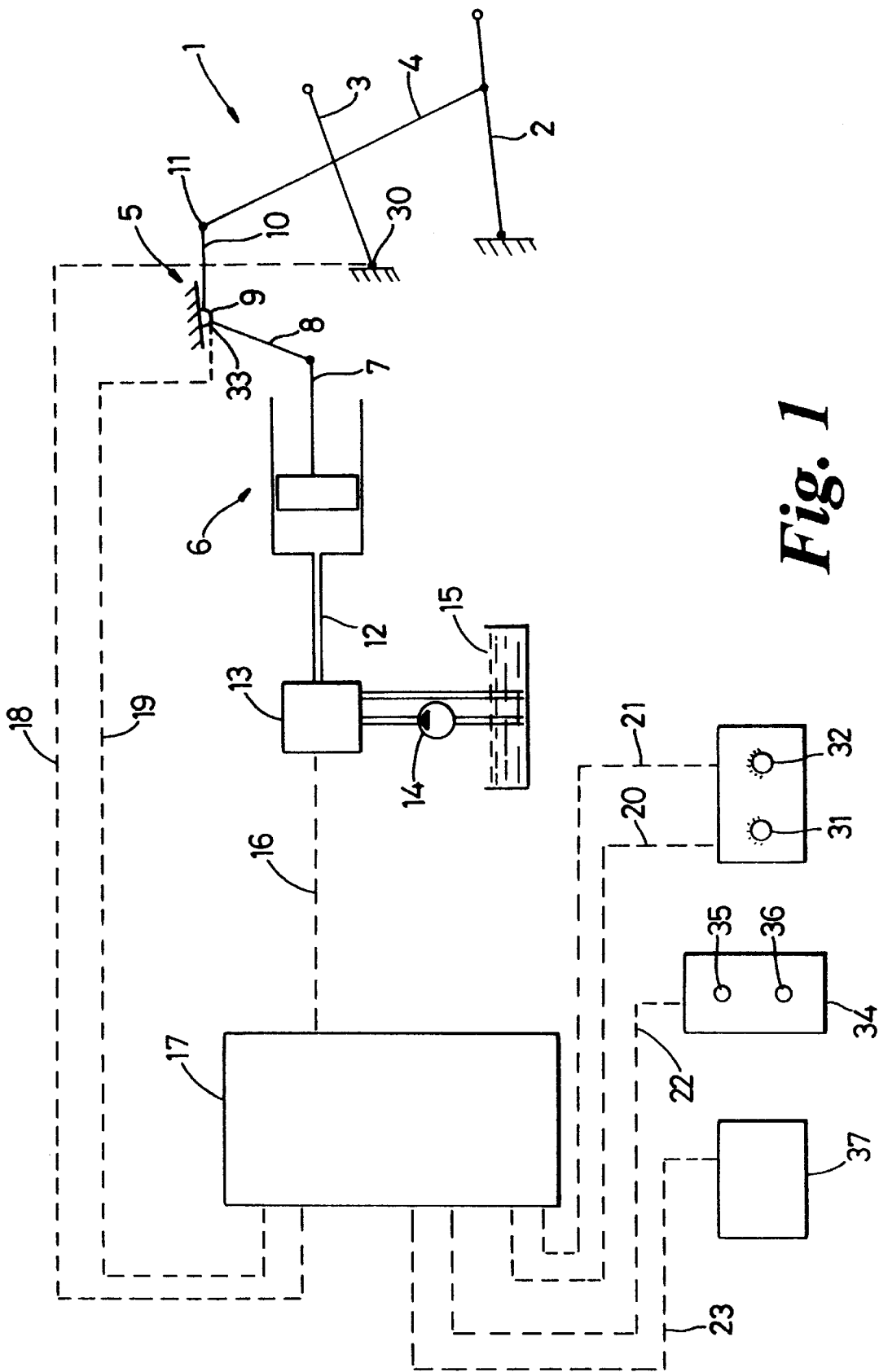
FIG. 1 is a schematic view of a three point linkage connected up to a control system in accordance with the invention.

The cylinder 6 is supplied with hydraulic fluid along a line 12 from an electro-hydraulic valve 13. The valve 13 is connected to a source 14 of pressurised hydraulic fluid and also a hydraulic fluid reservoir 15 at substantially zero pressure.

The valve 13 is controlled by electronic signals received along a line 16 from a microprocessor based control unit 17.

The control unit 17 receives an input along a line 18 from a force sensor 30 located in the linkage 1 in the region of the top link 3 such that the output of the sensor 30 reflects the loading on the top link 3.

The sensor 30 detects the load on the top link of the three point linkage, but it is equally possible for sensors to be incorporated in the joints joining the lower links 2 to the chassis and thereby to sense the force on the lower links 2.

An inductive angular position sensor 33 is incorporated on the pivoting shaft 9 on which the lifting mechanism 5 is mounted. This sensor 33 is connected via a signal line 19 to the control unit 17 and provides an indication of the position of the linkage 1 and thereby the height of implements connected to the linkage.

Lines 20 and 21 connect the unit 17 to cab mounted controls 31, 32 for setting desired draft force and desired linkage position respectively. Signal lines 20 and 21 thus carry signals representative of desired draft force and desired linkage position/height respectively to the control unit 17. Either the draft control knob 31 or position control knob 32 may have a "full drop" setting to which it has to be pushed against the action of a spring, and will snap back if released. This feature could alternatively be provided by a separate switch or the like; the operation of this feature will be explained below.

Mounted on the outside of the tractor is an external linkage control panel 34 incorporating an "up" button 35 and a "down" button 36. This unit is connected via a signal line 22 into the control unit 17.

Lastly, a signal line 23 carries into the unit a signal from a switch 37 which activates a transport damping mode.

The external position control, if used, will override any other control and the damping signal will override the main control for small movements of the linkage in its raised transport position.

The two embodiments differ in their modes of operation. The function of the first embodiment will now be described with reference to FIGS. 2a and 2b.

The microprocessor based control unit 17 generates two error signals, one for draft (De) and one for position (Pe).

The draft error signal De represents the difference between a desired linkage draft force as set by the draft control knob 31 and the actual draft force experienced by the linkage. The polarity (positive or negative) of the error signal changes in response to a draft force which is too low or too high relative to a desired set point.

The position error signal Pe represents the difference between a desired linkage height as set by the position control knob 32 and the actual linkage height. The polarity of error signal Pe changes in response to a linkage position which is too low or too high relative to a desired set point.

Thus positive error signals De, Pe are indications that the linkage needs to be raised, and negative ones that the linkage needs to be lowered.

The control unit 17 continually compares the two error signals De, Pe and determines which of the two error signals is to govern a control output on line 16 from the unit 17 to the valve 13 controlling the height of the linkage.

In this first embodiment, generally the error signal that generates the greatest positive output determines whether the system is to operate in draft or position mode.

If the error signals Pe, De are substantially equal, the system will operative in position mode.

Figure 2A:
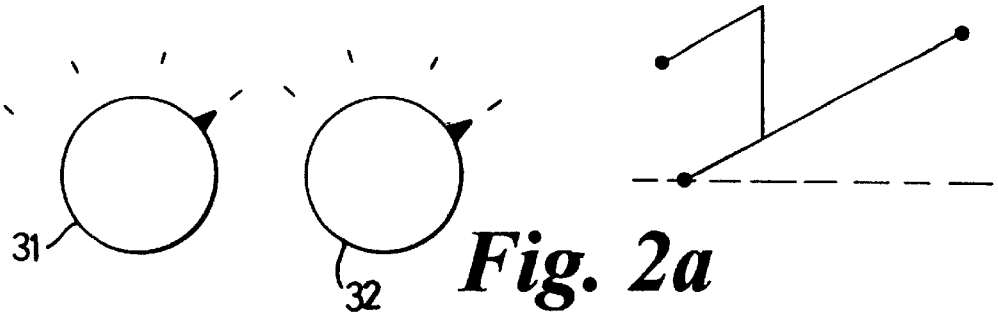
FIGS. 2a and 2b are a series of diagrams showing the position of linkage controls and corresponding linkage position for the first embodiment.

FIG. 2a illustrates the situation where both control knobs 31, 32 are in their "fully up" positions and the linkage is fully raised. The draft error De will be either zero or a positive value (indicating that the draft force on the linkage is higher than that set by the draft control knob 31, the linkage not moving because it is at its uppermost extent of travel). Let us assume the latter case. De will be greater than Pe because Pe must be zero, so that the system will be operating in "draft mode" even though the linkage is stationary in its fully raised position.

If the draft control 31 is moved to cause the draft error De to become negative, the zero position error Pe will be higher than the draft error De and the system will "switch" into "position mode" but the linkage will remain in its fully raised position.

Figure 2B:
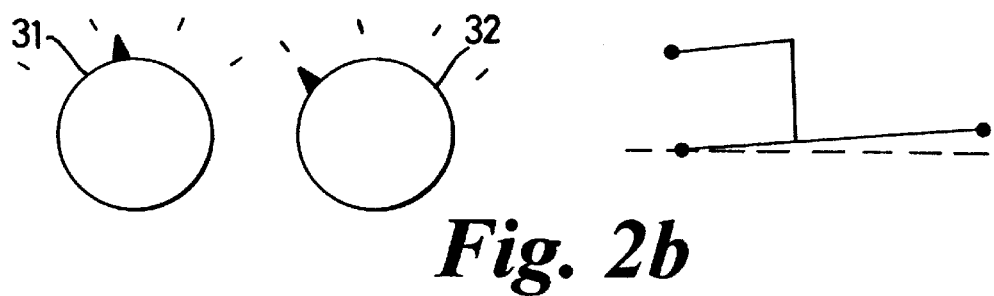

In order to lower the linkage, e.g., to lower an implement into work using draft control, the position control knob 32 must first be rotated fully anti-clockwise from the position shown in FIG. 2a to that shown in FIG. 2b. The system will change to draft mode and the linkage will remain raised until the draft knob is rotated anti-clockwise to set the desired draft force. The linkage will then lower in response to a control output governed by the draft error signal De.

As a practical matter, this means that to operate in position control mode, the draft control knob 31 is turned frilly anti-clockwise and to operate in draft control mode the position control knob 32 is turned filly anti-clockwise.

This embodiment has a potential problem when uncoupling an implement from the linkage. If the linkage, with an implement attached, is lowered to the ground using the position control knob 32, it is possible that the draft setting could be just below the sensed force on the linkage when it is fully lowered, and the system may go into draft mode. When the top link is uncoupled the sensed force could be changed and the links move unexpectedly.

The second embodiment was devised to overcome this problem and essentially operates as the first embodiment but in reverse. That is to say, generally the error signal Pe, De that generates the least positive output determines whether the system is to operate in draft or position modes.

The second embodiment is particularly suited to "top link force sensing" systems such as the one described here: the problem with the previous embodiment is more apparent in such systems.

As with the first embodiment, if the error signals Pe, De are substantially the same, the system will operate in position mode.

Figure 3A:
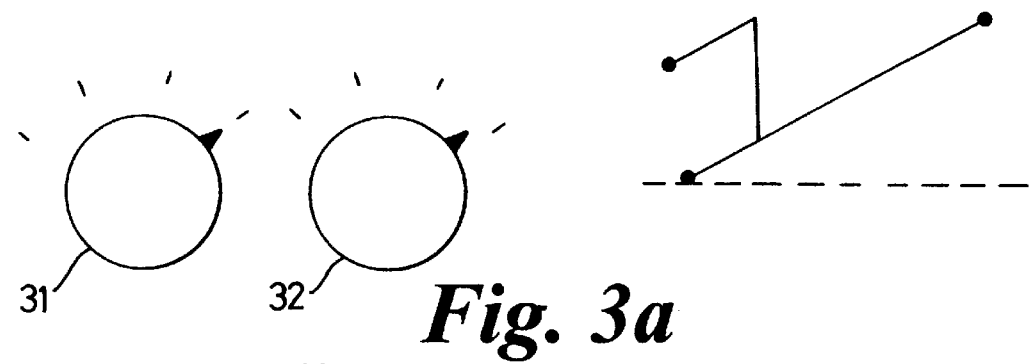
FIGS. 3a and 3b are a series of diagrams showing the position of linkage controls and corresponding linkage position for the second embodiment.

FIG. 3a shows both draft and position control knobs 31 and 32 in their "fully raised" positions. Once again, the position error Pe will be zero and the draft error De either zero or positive. In the latter case, the second embodiment system will be in position mode since Pe will be lower than De. The linkage may thus be lowered by rotating the position control knob 32 anti-clockwise. This is the mode of operation which would be used to lower the linkage to the ground to uncouple an implement, and thus unexpected linkage movements are avoided because the system is securely set in position control mode.

Figure 3B:
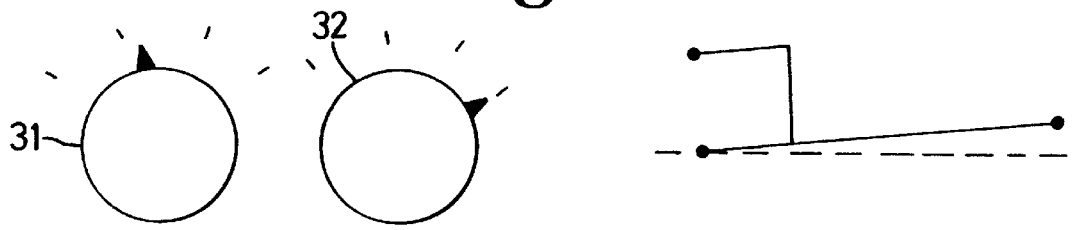

To lower an implement into work using the second embodiment system, the position control knob 32 is left at its fully raised position and the draft knob 31 turned to the desired setting (FIG. 3b). The control unit 17 detects when the draft error De requires the linkage to lower, the system switches into draft mode and the linkage comes to rest where the actual draft force equals the desired force set by the draft control 31.

In both first and second embodiments the control unit 17 has a deadband programmed into it, whereby the error signals De, Pe must be a given magnitude before any command is sent to raise or lower the linkage, to avoid instability in the control loop. Similarly, when transferring between modes, the difference between the error signals must reach a given magnitude before the system will "switch" from one mode to another, thus ensuring that the system is not continually switching modes at any point.

In the second embodiment, the draft control knob 31 may be moved against the action of a spring into "fulfill drop" mode. Line this mode a signal is sent to the valve 13 to completely open it and allow the linkage to drop as quickly as oil flows permit. This feature obviously overrides the control described above and is used when it is required to drop an implement into the ground to get initial penetration. A similar feature may be provided in the first embodiment which would function in exactly the same way but would be incorporated into the position control knob 32 rather than the draft control knob 31.

It will be appreciated that the above described control systems could easily be adapted to different means for raising and lowering the linkage, eg a pneumatic system or a motor driven system. It is also possible with an electronic control system such as those described above to incorporate relatively easily additional control features such as an automatic linkage drop rate dependent on the weight of implement fitted, the transport position "damping" feature as described briefly above, etc.

If the error signals are equal then the system operates in position mode.

We claim:

1. An electronic linkage control system for a tractor, the system comprising:
   (a) means for sensing actual draft force experienced by a tractor linkage and generating an electronic signal representative thereof;
   (b) means for sensing actual position of said linkage and generating an electronic signal representative thereof;
   (c) continuously variable manual input means for setting a desired draft force;
   (d) continuously variable manual input means for setting a desired position of said linkage;
   (e) means for generating an electronic output for controlling the position of said linkage, said output generating means being in either a first mode wherein said output is varied in dependence on said desired draft force or in a second mode wherein said output is varied in dependence on said desired position linkage, whereby said actual draft force or said actual linkage position respectively is compared to a corresponding value;
wherein said output generating means includes means for automatically switching the system between said first and second modes, said automatic switching means being responsive only to actual draft force, actual linkage position, set draft force, and set linkage position such that:
   (i) if the outputs in each of the first and second modes would be such as to cause the linkage to lower, then the output from the output generating means is such as to cause the linkage to lower;

(ii) if the outputs in the respective modes would be such as to cause the linkage to move in opposited directions, or if the output in one mode would cause the linkage to remain stationary while the output in the other mode would cause the linkage to lower, then the output generating means functions in whichever mode will cause the linkage to lower; and (iii) if the output inone mode would be such as to cause the linkage to remain stationary while the output in the other mode would cause the linkage to rise, the output generating means functions in whichever mode will cause the linkage to remain stationary.

2. The system as claimed in claim 1, wherein said draft force sensing means comprises means located so as to sense force on a top link of said linkage.

3. The system as claim in claim 2, wherein said draft force sensing means comprises no force sensing means other than said top link force sensing means.

4. An agricultural tractor comprising:

a chassis;

a linkage carried on said chassis; and an electronic linkage control system for controlling the operation of said linkage, said control system including:

(a) means for sensing actual draft force experienced by said linkage and generating an electronic signal representative thereof;

(b) means for sensing actual position of said linkage and generating an electronic signal representative thereof;

(c) continuously variable manual input means for setting a desired draft force;

(d) continuously variable manual input means for setting a desired position of said linkage;

(e) means for generating an electronic output for controlling the position of said linkage, said output generating means being in either a first mode wherein said output is varied in dependence on said desired draft force or in a second mode wherein said output is varied in dependence on said desired position linkage, whereby said actual draft force or said actual linkage position respectively is compared to a corresponding value;

wherein said output generating means includes means for automatically switching the system between said first and second modes, said automatic switching means being responsive only to actual draft force, actual linkage position, set draft force, and set linkage position such that:

(i) if the outputs in each of the first and second modes would be such as to cause the linkage to lower, then the output from the output generating means is such as to cause the linkage to lower;

(ii) if the outputs in the respective modes would be such as to cause the linkage to move in opposite directions, or if the output in one mode would cause the linkage to remain stationary while the output in the other mode would cause the linkage to lower, then the output generating means functions in whichever mode will cause the linkage to lower; and (iii) if the output in one mode would be such as to cause the linkage to remain stationary while the output in the other mode would cause the linkage to rise, the output generating means functions in whichever mode will cause the linkage to remain stationary.

5. The agricultural tractor as claimed in claim 4, wherein no manual means is provided for directly selecting in which of said first and second modes said output generating means is to operate, other than at least one of the group comprising:

(i) means for selecting a transport mode with a damping facility;

(ii) means located on an exterior of the tractor for varying the position of said linkage; and (iii) means for activating a full drop mode of the linkage system, in which mode said linkage is allowed to drop freely.

6. The agricultural tractor as claimed in claim 5 wherein said draft force sensing means comprises means located so as to sense force on a top link of said linkage.

7. The agricultural tractor as claimed in claim 6 wherein said draft force sensing means comprises no force sensing means other than said top link force sensing means.

* * * * *